(12) United States Patent
Chen et al.

(10) Patent No.: US 12,230,811 B2
(45) Date of Patent: Feb. 18, 2025

(54) BATTERY CELL, BATTERY, AND ELECTRICAL CONSUMING DEVICE

(71) Applicant: CONTEMPORARY AMPEREX TECHNOLOGY (HONG KONG) LIMITED, Hong Kong (CN)

(72) Inventors: Wenwei Chen, Ningde (CN); Wenlin Zhou, Ningde (CN); Xiangyan Bu, Ningde (CN); Xinxiang Chen, Ningde (CN); Peng Wang, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/167,083

(22) Filed: Feb. 10, 2023

(65) Prior Publication Data
US 2023/0198054 A1 Jun. 22, 2023

Related U.S. Application Data

(63) Continuation of application No. PCT/CN2022/070207, filed on Jan. 5, 2022.

(30) Foreign Application Priority Data

May 27, 2021 (CN) .......................... 202121164665.8

(51) Int. Cl.
*H01M 50/103* (2021.01)
*H01M 50/15* (2021.01)
(Continued)

(52) U.S. Cl.
CPC ......... *H01M 50/103* (2021.01); *H01M 50/15* (2021.01); *H01M 50/176* (2021.01);
(Continued)

(58) Field of Classification Search
CPC ............. H01M 50/103; H01M 50/531; H01M 50/176; H01M 50/55; H01M 50/15; H01M 2220/20
See application file for complete search history.

(56) References Cited

U.S. PATENT DOCUMENTS

| | | | |
|---|---|---|---|
| 2012/0160559 | A1 | 6/2012 | Tsutsumi et al. |
| 2015/0079460 | A1 | 3/2015 | Byun et al. |
| | | (Continued) | |

FOREIGN PATENT DOCUMENTS

| | | |
|---|---|---|
| CN | 203103376 U | 7/2013 |
| CN | 104380500 A | 2/2015 |
| | (Continued) | |

OTHER PUBLICATIONS

The extended European search report received in the corresponding European application 22757473.8, mailed Sep. 11, 2023.
(Continued)

*Primary Examiner* — Jane J Rhee
(74) *Attorney, Agent, or Firm* — Kilpatrick Townsend & Stockton LLP (57) ABSTRACT

In some embodiments, the battery cell includes a shell, including an opening; an electrode unit, accommodated in the shell, the electrode unit including a main body portion and a tab portion protruding from the main body portion; a cap assembly, for connecting with the shell, and covering and closing the opening; and a first insulating member, accommodated in the shell and adapted to isolate at least part of the main body portion from the shell, the first insulating member including a first insulating plate, and the first insulating plate being disposed on a side of the main body portion facing the cap assembly and being attached to the main body portion. The first insulating member can insulate at least part of the main body portion from the shell.

13 Claims, 6 Drawing Sheets

(51) Int. Cl.
*H01M 50/176* (2021.01)
*H01M 50/531* (2021.01)
*H01M 50/55* (2021.01)

(52) U.S. Cl.
CPC ......... *H01M 50/531* (2021.01); *H01M 50/55* (2021.01); *H01M 2220/20* (2013.01)

(56) References Cited

U.S. PATENT DOCUMENTS

2015/0340663 A1* 11/2015 Minagata ............. H01M 50/119
429/163
2016/0099440 A1   4/2016 Park et al.

FOREIGN PATENT DOCUMENTS

| CN | 204927359 | U  | 12/2015 |
| CN | 111106299 | A  | 5/2020  |
| EP | 3174126   | A1 | 5/2017  |
| JP | 2011155001| A  | 8/2011  |
| JP | 2012155888| A  | 8/2012  |
| JP | 2013161632| A  | 8/2013  |
| JP | 2014038736| A  | 2/2014  |
| JP | 2014041724| A  | 3/2014  |
| JP | 2018032523| A  | 3/2018  |
| JP | 2018120789| A  | 8/2018  |
| WO | 2014002647| A1 | 1/2014  |

OTHER PUBLICATIONS

Notice of Reasons for Refusal received in the corresponding Japanese application 2022-552247, mailed Aug. 21, 2023.
International Search Report received in the corresponding International Application PCT/CN2022/070207, mailed Mar. 30, 2022.

* cited by examiner

BATTERY CELL, BATTERY, AND ELECTRICAL CONSUMING DEVICE

CROSS REFERENCE TO RELATED APPLICATION

This application is a continuation of International Application PCT/CN2022/070207, filed Jan. 5, 2022, which claims the priority of the Chinese Patent Application No.: 202121164665.8, filed on May 27, 2021 and titled "Battery cell, Battery and Electrical Consuming Device", which are incorporated herein by reference in their entireties.

TECHNICAL FIELD

The present disclosure relates to a technical field of battery, and particularly relates to a battery cell, a battery, and an electrical consuming device.

BACKGROUND

Battery cells are widely used in electronic devices, such as mobile phones, notebook computers, battery cars, electric vehicles, electric planes, electric ships, electric toy cars, electric toy ships, electric toy planes, and electric tools. The battery cells may include nickel-cadmium battery cells, nickel-hydrogen battery cells, lithium ion battery cells, secondary alkaline zinc-manganese battery cells, and the like.

In the development of battery technology, besides improvement of performance of battery cells, safety is also an issue that cannot be ignored. If the safety of the battery cells cannot be guaranteed, the battery cells cannot be used. Therefore, it is an urgent technical problem to be solved in battery technology to enhance the safety of the battery cells.

SUMMARY

The present disclosure provides a battery cell, a battery and an electrical consuming device, which can reduce the risk of short circuit and improve the safety performance.

On a first aspect, the present application provides a battery cell, including:
- a shell, including an opening;
- an electrode unit, accommodated in the shell, the electrode unit including a main body portion and a tab portion protruding from the main body portion;
- a cap assembly, for connecting with the shell, and covering and closing the opening; and
- a first insulating member, accommodated in the shell and adapted to isolate at least part of the main body portion from the shell, the first insulating member including a first insulating plate, and the first insulating plate being disposed on a side of the main body portion facing the cap assembly and being attached to the main body portion.

In the above-mentioned solution, by providing the first insulating member, the present application can isolate at least part of the main body portion from the shell, and even if particles remaining in the shell pierce the separator of the main body portion, the first insulating member can prevent the electrode plates in the main body portion from conducting with the shell, thereby reducing the risk of short circuit. The first insulating plate may cover a portion of an end face of the main body portion facing the cap assembly, and may block particles, thereby reducing particles falling into the main body portion and reducing the risk of short circuit. The first insulating member is connected to the main body portion through the first insulating plate attached to the main body portion, and thus, the electrode unit and the first insulating member can be pre-assembled together, and then the electrode unit is assembled with other components; as such, the first insulating member can protect the electrode unit during the assembly process, reduce the risk of external impurities adhering to the electrode unit, and improve the safety performance of the battery cell.

In some embodiments, the first insulating plate is attached to a surface of the main body portion from which the tab portion is drawn out. There are gaps on the surface of the main body portion from which the tab portion is drawn out, and the first insulating plate of the embodiments of the present application can cover the gaps on the surface of the main body portion, thereby reducing the risk of particles entering the main body portion and improving the safety performance of the battery cells.

In some embodiments, the first insulating plate includes an insulating layer and a bonding layer, and the bonding layer is disposed on a surface of the insulating layer facing the main body portion and bonded to the main body portion. The bonding connection manner is easy to operate, which facilitates to simplify the assembly process of the first insulating member and the electrode unit.

In some embodiments, a plurality of the first insulating plates are provided, and the plurality of the first insulating plates are arranged at intervals along a circumferential direction of the main body portion. The plurality of first insulating plates can increase the connection area between the first insulating member and the main body portion, and increase the connection strength between the first insulating member and the main body portion. Since the plurality of first insulating plates are arranged at intervals along the circumferential direction of the main body portion, the acting force between the first insulating member and the main body portion is made more uniform and the stress concentration is reduced.

In some embodiments, the first insulating member further includes: two second insulating plates, respectively disposed on two sides of the main body portion in a first direction; and two third insulating plates, respectively disposed on two sides of the main body portion in a second direction, wherein each third insulating plate connects the two second insulating plates. An end of the second insulating plate close to the cap assembly is connected with the first insulating plate, and/or an end of the third insulating plate close to the cap assembly is connected with the first insulating plate. The first direction and the second direction are arranged to intersect with each other, and the first direction and the second direction are respectively perpendicular to a thickness direction of the cap assembly. The two second insulating plates can isolate the main body portion from the shell in the first direction, and the two third second insulating plates can isolate the main body portion from the shell.

In some embodiments, the third insulating plate includes a first portion and a second portion, the first portion is provided integrally with one of the second insulating plates, and the second portion is provided integrally with the other one of the second insulating plates. The first portion and the second portion at least partially overlap in the second direction, and are connected in an overlapping region; and/or the first portion and the second portion are both bonded to the main body portion.

In some embodiments, the first insulating member further includes a fourth insulating plate located on a side of the main body portion facing away from the first insulating plate and connecting the two second insulating plates, the first insulating plate and the fourth insulating plate are arranged along a third direction, and the first direction, the second direction and the third direction intersect with each other. The fourth insulating plate can isolate and insulate a bottom wall of the shell facing the cap from the main body portion and thus reduce the risk of short circuit.

In some embodiments, the fourth insulating plate includes a third portion and a fourth portion, the third portion is provided integrally with one of the second insulating plates, and the fourth portion is provided integrally with the other one of the second insulating plates. The third portion and the fourth portion at least partially overlap in the third direction, and are connected in an overlapping region; and/or, the third portion and the fourth portion are both bonded to the main body portion.

In some embodiments, the cap assembly includes a cap, an electrode terminal and a second insulating member, the cap is adapted to cover and close the opening, the electrode terminal is mounted on the cap, and the second insulating member is located on a side of the cap facing the electrode unit. The battery cell further includes a current collecting member, and the current collecting member is adapted to connect the electrode terminal with the tab portion. The second insulating member is formed with a first concave portion on a side facing the main body portion, the first concave portion is configured to accommodate at least part of the tab portion and/or at least part of the current collecting member. At least part of the first insulating plate is sandwiched between the second insulating member and the main body portion.

In the above-mentioned solution, the first concave portion can accommodate at least part of the tab portion and/or at least part of the current collecting member, which can free up more space for the electrode unit. The second insulating member presses the first insulating plate from one side, so that the first insulating plate is closely attached to the main body portion, and thus the connection strength between the first insulating plate and the main body portion is improved and the risk of the first insulating plate being separated from the main body portion is reduced.

In some embodiments, the second insulating member is formed with a first convex portion on a side facing away from the main body portion at a position corresponding to the first concave portion, the cap is formed with a second concave portion on a side facing the main body portion, and the second concave portion is adapted to accommodate the first convex portion. On the one hand, the first convex portion can strength the position of the second insulating member provided with the first concave portion, and on the other hand, the arrangement of the first convex portion can make the first concave portion recess as much as possible in a direction away from the main body portion, so as to increase the recessed depth of the first concave portion. Since the first convex portion is accommodated in the second concave portion, the inner space of the shell occupied by the second insulating member can be reduced, and more space is further freed up for the electrode unit, thereby effectively increasing the capacity of the battery cell.

In some embodiments, two surfaces of the first insulating plate are bonded to the second insulating member and the main body portion, respectively; as such, the risk of the first insulating plate being disengaged from the position between the second insulating member and the main body portion can be reduced.

On a second aspect, the present application provides a battery includes a case and the battery cell according to any of the embodiments on the first aspect, wherein the battery cell is accommodated in the case.

On a third aspect, the present application provides an electrical consuming device including the battery according to the second aspect, the battery is adapted to provide electrical energy.

BRIEF DESCRIPTION OF THE DRAWINGS

The features, advantages and technical effects of the exemplary embodiments of the present application will be described below with reference to the accompanying drawings.

In the accompanying drawings, the accompanying drawings are not necessarily drawn to actual scale.

DETAILED DESCRIPTION

In order to make the objectives, technical solutions and advantages of the embodiments of the present application clearer, the technical solutions in the embodiments of the present application will be clearly described below in combination with the accompanying drawings in the embodiments of the present application; obviously, the described embodiments are some, but not all the embodiments of the present application. Based on the embodiments in the present application, all other embodiments obtained by the person skilled in the art without creative work fall within the protection scope of the present application.

Unless otherwise defined, all technical and scientific terms used in the present application have the same meaning as commonly understood by the person skilled in the art of the present application; the terms of the present application used in the specification are merely used for describing specific embodiments while are not intended to limit the present application; the terms "comprising" and "including" in the specification, claims and the above description of the accompanying drawings of the present application and any variations thereof are intended to cover non-exclusive inclusions. The terms "first", "second" and the like in the specification, claims or the above description of the accompanying drawings are used to distinguish different objects, rather than to describe a specific order or primary and secondary relationship.

Reference to an "embodiment" in the present application means that a particular feature, structure or characteristic described in combination with the embodiment can be included in at least one embodiment of the present application. The appearances of this word in various places in the specification are not necessarily all referring to the same embodiment, nor a separate or alternative embodiment that is mutually exclusive of other embodiments.

In the description of the present application, it should be noted that, unless otherwise expressly specified and limited, the terms "installed", "coupled", "connected" and "attached" should be understood in a broad sense, for example, may be a fixed connection, and also may be a detachable connection, or an integral connection; it can be a direct connection, an indirect connection through an intermediate medium, or an internal communication between two components. For the person skilled in the art, the specific meanings of the above terms in the present application can be understood according to specific situations.

The terms "and/or" in the present application, is only used to describe association relationship between associated objects, and indicates three kinds of relationships; for example, A and/or B, can mean that only A exists, A and B exist simultaneously, or only B exists. In addition, the character "/" in the present application generally indicates that relationship between the associated objects before and after the character is an "or" relationship.

In various embodiments, the same reference numerals denote the same components, and for brevity, in different embodiments, detailed descriptions of the same components are omitted. It should be understood that the thickness, length, width and other dimensions of various components in the embodiments of the present application shown in the accompanying drawings, as well as the dimensions, such as the overall thickness, length and width, and the like of integrated device are only exemplary descriptions, and should not constitute any limitation to the present application.

"A plurality of" as used in the present application refers to two or more (including two).

In the present application, the battery cell may include a lithium ion secondary battery cell, a lithium ion primary battery cell, a lithium sulfur battery cell, a sodium lithium ion battery cell, a sodium ion battery cell, a magnesium ion battery cell, or the like, and this is not limited in the embodiments of the present application. The battery cell may be in the form of a cylinder, a flat body, a cuboid, or other shapes, and this is not limited in the embodiments of the present application. The battery cell can be generally divided into three types according to the packaging manner: a cylindrical battery cell, a square battery cell, and a soft-pack battery cell, and this is not limited in the embodiments of the present application.

The battery mentioned in various embodiments refers to a single physical module including one or more battery cells to provide higher voltage and capacity. For example, the battery mentioned in the present application may include battery modules or battery packs, and the like. The battery typically include a case for enclosing one or more battery cells. The case can prevent liquids or other external objects from affecting charging or discharging of the battery cells.

The battery cell includes an electrode unit and electrolyte, the electrode unit includes at least one electrode assembly, and the electrode assembly includes a positive electrode plate, a negative electrode plate and a separator. The working of the battery cell mainly relies on the movement of metal ions between the positive electrode plate and the negative electrode plate. The positive electrode plate includes a positive current collector and a positive active material layer, and the positive active material layer is coated on a surface of the positive current collector; the positive current collector includes a positive current collecting portion and a positive convex portion protruding from the positive current collecting portion, the positive current collecting portion is coated with the positive active material layer, at least part of the positive convex portion is not coated with the positive active material layer, and the positive convex portion is used as a positive tab. Taking a lithium ion battery as an example, the material of the positive current collector can be aluminum, the positive active material layer includes a positive active material, and the positive active material can be lithium cobalt oxide, lithium iron phosphate, ternary lithium, lithium manganate, or the like. The negative electrode plate includes a negative current collector and a negative active material layer, and the negative active material layer is coated on a surface of the negative current collector; the negative current collector includes a negative current collecting portion and a negative convex portion protruding from the negative current collecting portion, the negative current collecting portion is coated with the negative active material layer, at least part of the negative convex portion is not coated with the negative active material layer, and the negative convex portion is used as the negative tab. The material of the negative current collector can be copper, the negative active material layer includes a negative active material, and the negative active material can be carbon, silicon or the like. In order to ensure that the tabs can allow a large current to flow through without fusing, multiple positive tabs are provided and stacked together, and multiple negative tabs are provided and stacked together. The material of the separator may be PP (polypropylene) or PE (polyethylene). In addition, the electrode assembly may be a wound structure or a laminated structure, and the embodiment of the present application is not limited thereto.

Some particles may remain inside the battery cell, and the particles (especially metal particles) falling on the electrode assembly may pierce the separator, causing conduction between the positive electrode plate and the negative electrode plate, thereby causing the risk of short circuit.

In view of this, one embodiment provides a technical solution, in which the battery cell includes: a shell, provided with an opening; an electrode unit, accommodated in the shell, and including a main body portion and a tab portion protruding from the main body portion; a cap assembly for connecting with the shell and covering and closing the opening; and a first insulating member, accommodated in the shell and adapted for isolating at least part of the main body portion from the shell, the first insulating member includes a first insulating plate, the first insulating plate being disposed on a side of the main body portion facing the cap assembly and attached to the main body portion. The battery cell with such configuration can reduce the risk of short circuit and improve the safety performance.

The technical solutions described in the embodiments of the present application are applicable to a battery and an electrical consuming device using the battery.

The electrical consuming device can be a vehicle, a mobile phone, a portable device, a notebook computer, a ship, a spacecraft, an electric toy, an electric tool, and the like. The vehicle can be a fuel vehicle, a gas vehicle or a new energy vehicle, and the new energy vehicle can be a pure electric vehicle, a hybrid vehicle, an extended-range vehicle, or the like; the spacecraft includes an airplane, a rocket, a space shuttle, a space ship, and the like; the electric toy includes an electric toy of stationary type or movable type, for example a game console, an electric car toy, an electric ship toy and an electric airplane toy, and the like; the electric tool includes a metal cutting electric tool, a grinding electric tool, an assembling electric tool and a railway electric tool, such as, an electric drill, an electric grinder, an electric wrench, an electric screwdriver, an electric hammer, an electric impact drill, a concrete vibrator and an electric planer, and the like. The embodiments of the present application do not particularly limit the above-mentioned electrical consuming device.

For the convenience of description, the following embodiments are described by taking the vehicle as an example of the electrical consuming device.

Figure 1:
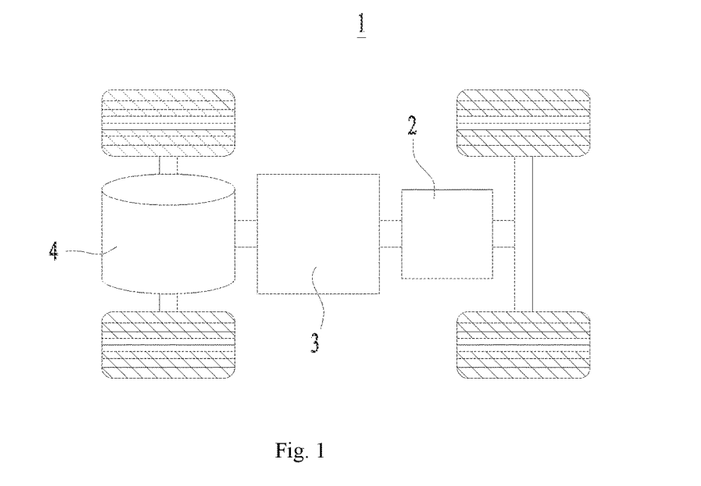
FIG. 1 is a structural schematic diagram of a vehicle provided by some embodiments of the present application.

FIG. 1 is a schematic structural diagram of a vehicle provided by some embodiments of the present application. As shown in FIG. 1, the vehicle 1 is provided with a battery 2 in its interior, and the battery 2 may be disposed at the bottom, head or tail of the vehicle 1. The battery 2 can be used for power supply of the vehicle 1, and for example, the battery 2 can be used as an operating power source of the vehicle 1.

The vehicle 1 may further include a controller 3 and a motor 4, and the controller 3 is used to control the battery 2 to supply power to the motor 4, for example, for satisfying the work power requirements of the vehicle 1 when the vehicle 1 starts, navigates and travels.

In some embodiments of the present application, the battery 2 can not only be used as the operating power source of the vehicle 1, but also can be used as a driving power source of the vehicle 1 to provide driving power for the vehicle 1 instead of or partially instead of fuel or natural gas.

Figure 2:
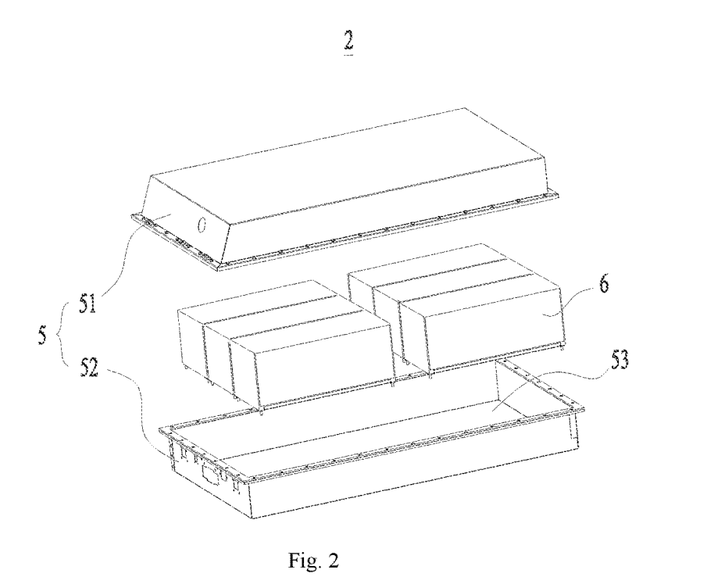
FIG. 2 is an exploded schematic diagram of a battery provided by some embodiments of the present application.

FIG. 2 is an exploded schematic diagram of a battery provided by some embodiments of the present application. As shown in FIG. 2, the battery 2 includes a case 5 and battery cells (not shown in FIG. 2), and the battery cells are accommodated in the case 5.

The case 5 is used to accommodate the battery cells, and the case 5 may be formed in various structures. In some embodiments, the case 5 may include a first case portion 51 and a second case portion 52, and the first case portion 51 and the second case portion 52 cover and close each other, and define an accommodating space 53 for accommodating the battery cells together. The second case portion 52 may be formed as a hollow structure with one end open, while the first case portion 51 may be formed as a plate-like structure, and the first case portion 51 covers and closes an opening side of the second case portion 52 to form the case 5 with the accommodating space 53; each of the first case portion 51 and the second case portion 52 may be formed as a hollow structure with one side open, and an opening side of the first case portion 51 covers and closes an opening side of the second case portion 52, so as to form the case 5 with the accommodating space 53. Certainly, the first case portion 51 and the second case portion 52 may be formed in various shapes, such as cylinders, cuboids, and the like.

In order to improve the sealing after the first case portion 51 and the second case portion 52 are connected, a sealing member, such as sealant, a sealing ring, can further be provided between the first case portion 51 and the second case portion 52.

Assuming that the first case portion 51 covers and closes a top portion of the second case portion 52, the first case portion 51 may further be referred to as an upper case cover, while the second case portion 52 may further be referred to as a lower case body.

In the battery 2, there may be one battery cell or a plurality of battery cells. If there are a plurality of battery cells, the plurality of battery cells can be connected in series or in parallel or in a mixed manner. The mixed manner means that there are both series and parallel connections among the plurality of battery cells. The battery cells can be directly connected in series or in parallel or in the mixed manner, and then an integrity constituted by the plurality of battery cells can be accommodated in the case 5; certainly, it is also available that the plurality of battery cells are connected in series or in parallel or in the mixed manner to constitute battery modules 6 at first, and then a plurality of battery modules 6 are connected in series or in parallel or in the mixed manner to form an integrity, which is accommodated in the case 5.

Figure 3:
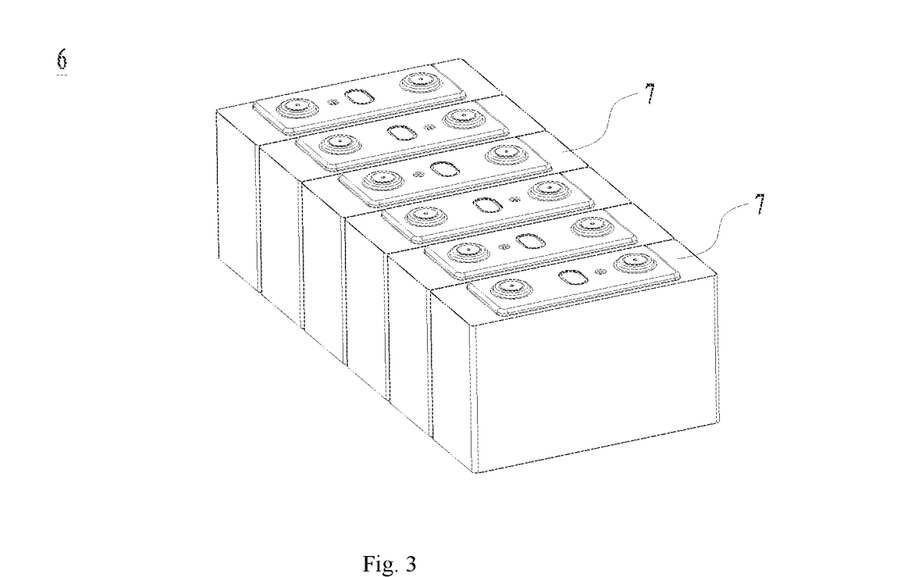
FIG. 3 is a structural schematic diagram of a battery module as shown in FIG. 2.

FIG. 3 is a schematic structural diagram of the battery module shown in FIG. 2. As shown in FIG. 3, in some embodiments, there are a plurality of battery cells 7, and the plurality of battery cells 7 are connected in series or in parallel or in a mixed manner to constitute the battery module 6 at first. Then, a plurality of battery modules 6 are connected in series or in parallel or in a mixed manner to form an integrity, which is accommodated in the case.

The plurality of battery cells 7 in the battery module 6 can be electrically connected through a bus bar, so as to realize parallel connection, series connection or mixed connection of the plurality of battery cells 7 in the battery module 6.

Figure 4:
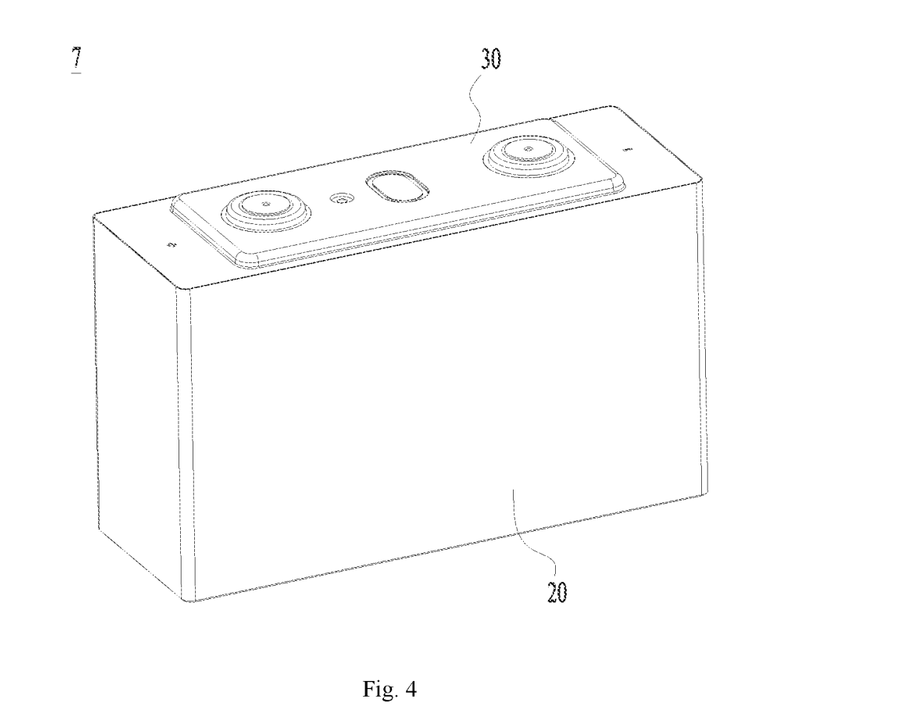
FIG. 4 is a structural schematic diagram of a battery cell provided by some embodiments of the present application.
Figure 5:
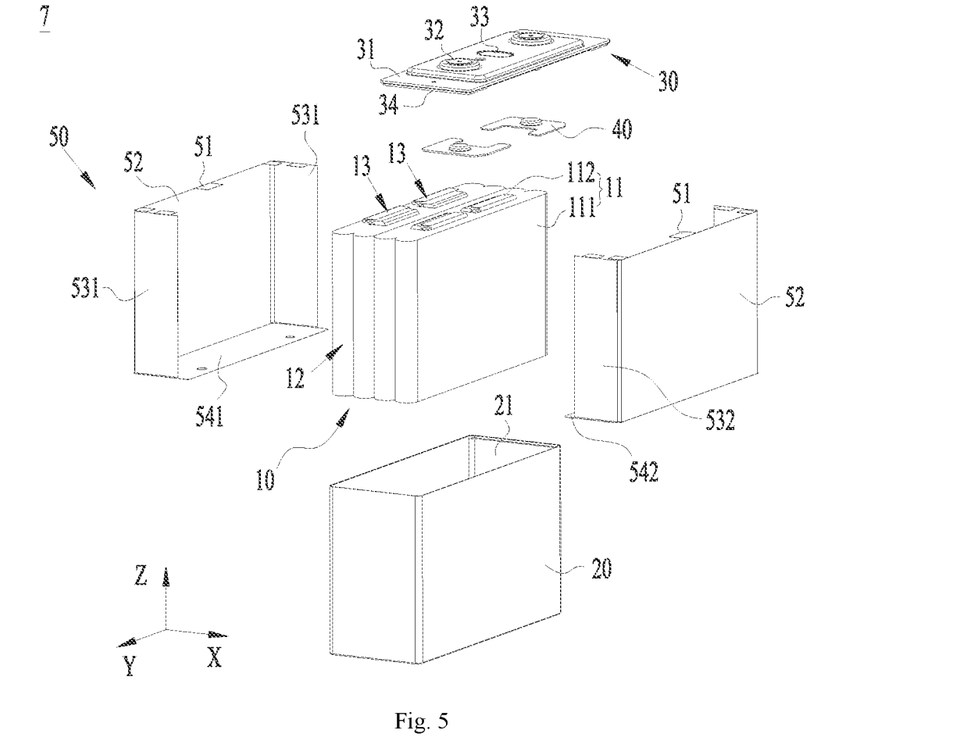
FIG. 5 is an exploded schematic diagram of the battery cell as shown in FIG. 4.

FIG. 4 is a structural schematic diagram of a battery cell provided by some embodiments of the present application; FIG. 5 is an exploded schematic diagram of the battery cell shown in FIG. 4; and FIG. 6 is a structural schematic diagram of an electrode unit and a first insulating member of a battery cell provided by some embodiments of the present application.

Figure 6:
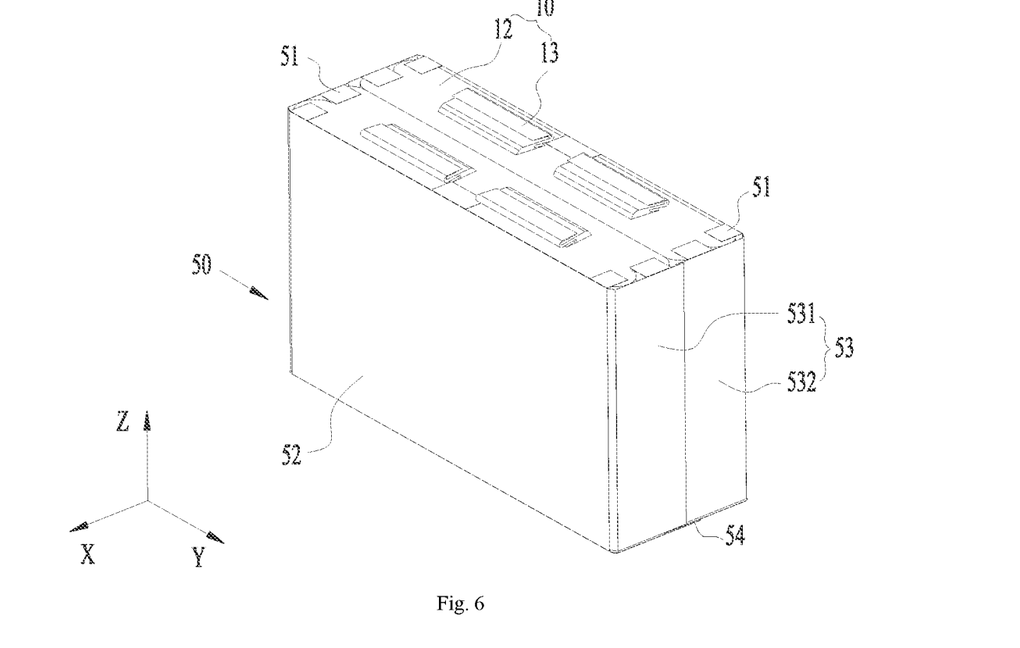
FIG. 6 is a structural schematic diagram of an electrode unit and a first insulating member of a battery cell provided by some embodiments of the present application.

As shown in FIG. 4 to FIG. 6, the battery cell 7 of the embodiments of the present application includes an electrode unit 10, a shell 20 and a cap assembly 30. The shell 20 includes an opening 21, the electrode unit 10 is accommodated in the shell 20, and the cap assembly 30 is used to connect with the shell 20 and cover and close the opening 21.

The electrode unit 10 includes at least one electrode assembly 11. The electrode assembly 11 includes a positive electrode plate, a negative electrode plate, and a separator. The electrode assembly 11 may be a wound electrode assembly, a laminated electrode assembly, or an electrode assembly in other forms.

In some embodiments, the electrode assembly 11 is a wound electrode assembly. The positive electrode plate, the negative electrode plate and the separator are all formed as strip-shaped structures. In the embodiments of the present application, the positive electrode plate, the separator and the negative electrode plate can be stacked in sequence and wound for more than two turns to form the electrode assembly 11.

In some other embodiments, the electrode assembly 11 is a laminated electrode assembly. Specifically, the electrode assembly 11 includes a plurality of positive electrode plates and a plurality of negative electrode plates, the positive electrode plates and the negative electrode plates are alternately stacked, and the stacking direction is parallel to a thickness direction of the positive electrode plates and a thickness direction of the negative electrode plates.

Viewing from an external appearance of the electrode assembly 11, the electrode assembly 11 includes a current generating portion 111 and a current lead-out portion 112 connected to the current generating portion 111. Exemplarily, the current lead-out portion 112 extends out from one end of the current generating portion 111 close to the cap assembly 30.

In some embodiments, there are two current lead-out portions 112, and the two current lead-out portions 112 are respectively defined as a positive lead-out portion and a negative lead-out portion. The positive lead-out portion and the negative lead-out portion may extend out from the same end of the current generating portion 111, or may extend out from two opposite ends of the current generating portion 111, respectively.

The current generation portion 111 is the core part of the electrode assembly 11 to realize the charging and discharging function, and the current lead-out portion 112 is used to lead out the current generated by the current generation portion 111. The current generating portion 111 includes a positive current collecting portion of a positive electrode current collector, a positive active material layer, a negative current collecting portion of a negative electrode current collector, a negative active material layer, and a separator. The positive lead-out portion includes a plurality of positive tabs, and the negative lead-out portion includes a plurality of negative tabs.

The electrode unit 10 includes at least one electrode assembly 11. That is, in the battery cell 7, one or more the electrode assembly 11 are accommodated in the shell 20.

Viewing from an external appearance of the electrode unit, the electrode unit 10 includes a main body portion 12 and a tab portion 13 protruding from the main body portion 12. The tab portion 13 includes a positive tab portion and a negative tab portion.

In some embodiments, the electrode unit 10 includes only one electrode assembly 11. In this case, the main body portion 12 includes the current generating portion 111 of the electrode assembly 11, the positive tab portion includes the positive lead-out portion, and the negative tab portion includes the negative lead-out portion.

In some other embodiments, the electrode unit 10 includes a plurality of electrode assemblies 11. In this case, the main body portion 12 includes the current generating portions 111 of the plurality of electrode assemblies 11, and the plurality of current generating portions 111 are stacked together. The number of the positive tab portion is one or more, and the positive tab portion includes the positive lead-out portion of at least one electrode assembly 11; the number of the negative tab portion is one or more, and the negative tab portion includes the negative electrode lead-out portion of at least one electrode assembly 11. For example, the electrode unit 10 includes four electrode assemblies 11, the main body portion 12 includes the current generating portions 111 of the four electrode assemblies 11; there are two positive tab portions, and each positive tab portion includes two positive lead-out portions stacked together; there are two negative tab portions, and each negative tab portion includes two negative lead-out portions stacked together.

The shell 20 is formed as a hollow structure with one side open. The cap assembly 30 includes a cap 31, and the cap 31 covers and closes an opening of the shell 20 and forms a sealing connection with the shell 20 to form an accommodating cavity for accommodating the electrode unit 10 and the electrolyte.

The shell 20 may be formed in various shapes, such as a cylinder, a cuboid and the like. The shape of the shell 20 may be determined according to the specific shape of the main body portion 12 of the electrode unit 10. For example, if the main body portion 12 is formed in a cylindrical shape, a cylindrical shell can be selected; if the main body portion 12 is formed in a shape of a cuboid, a cuboid shell can be selected. Certainly, the cap 31 also may be formed in various structures, for example, the cap 31 is formed as a plate-like structure or a hollow structure with one end open. Exemplarily, in FIG. 5, the shell 20 is formed as a cuboid structure, the cap 31 is formed as a plate-like structure, and the cap 31 covers and closes the opening at the top of the shell 20.

The cap assembly 30 further includes an electrode terminal 32 mounted on the cap 31. In some embodiments, two electrode terminals 32 are provided, and the two electrode terminals 32 are respectively defined as a positive electrode terminal and a negative electrode terminal. The positive electrode terminal and the negative electrode terminal are used to electrically connect with the positive tab portion and the negative tab portion, respectively, to output the current generated by the current generating portion 111.

The cap assembly 30 further includes a pressure relief mechanism 33 mounted on the cap 31, and the pressure relief mechanism 33 is used to release an internal pressure or lower a temperature of the battery cell 7 when the internal pressure or temperature of the battery cell 7 reaches a predetermined value. Exemplarily, the pressure relief mechanism 33 is located between the positive electrode terminal and the negative electrode terminal, and may be a component such as an explosion-proof valve, a rupture disk, a gas valve, a pressure relief valve or a safety valve.

In some embodiments, the shell 20 further may be a hollow structure with two opposite sides open. The cap assembly 30 includes two caps 31, and the two caps 31 respectively cover and close two openings of the shell 20 and form sealing connections with the shell 20, so as to form an accommodating cavity for accommodating the electrode unit 10 and the electrolyte. In some examples, the positive electrode terminal and the negative electrode terminal may be mounted on the same cap 31, and the positive tab portion and the negative tab portion extend from an end of the main body portion 12 toward this cap 31. In some other examples, the positive electrode terminal and the negative electrode terminal are respectively mounted on the two caps 31, and the positive tab portion and the negative tab portion respectively extend from two ends of the main body portion 12 respectively facing the two caps 31.

The tab portion 13 may be directly connected to the electrode terminal 32, or may be indirectly connected to the electrode terminal 32 through other members. In some embodiments, the battery cell 7 further includes a current collecting member 40 for connecting the electrode terminal 32 with the tab portion 13. Exemplarily, two current collecting members 40 are provided, one current collecting member 40 is used to electrically connect the positive electrode terminal with the positive tab portion, and the other current collecting member 40 is used to electrically connect the negative electrode terminal with the negative tab portion.

The current collecting member 40 is accommodated in the shell 20 and located between the main body portion 12 and the cap 31. The current collecting member 40 may be connected to the electrode terminal 32 and the tab portion 13 by welding, riveting, bonding or other manners. Optionally, the current collecting member 40 is welded to the electrode terminal 32 and the tab portion 13.

In some embodiments, the battery cell 7 further includes a first insulating member 50, which is accommodated in the shell 20 and adapted for separating at least part of the main body portion 12 from the shell 20, the first insulating member 50 includes a first insulating plate 51, and the first insulating plate 51 is disposed on a side of the main body portion 12 facing the cap assembly 30 and is attached to the main body portion 12.

The first insulating member 50 wraps at least part of the main body portion 12 from an outer side to isolate the at least part of the main body portion 12 from the shell 20.

The first insulating plate 51 is fitted and connected to the main body portion 12. "Attached to" refers to connection by means of adhesion or the like.

The number of the first insulating plate 51 may be one or more.

The first insulating member 50 may be an integral member, or may include a plurality of separable members, and the plurality of separable members may be connected together or may be independent of each other.

Particles (for example, metal particles generated during welding) may be generated during assembly process of the battery cell 7, and the particles may remain in the shell 20. The particles may adhere to a surface of the main body portion 12, and may pierce the separator of the main body portion 12 and cause the risk of conduction between the shell 20 and the main body portion 12; the particles may further fall into an interior of the main body portion 12 and conduct the positive electrode plate and the negative electrode plate, resulting in a short circuit and a safety risk.

In the present application, by providing the first insulating member 50, at least part of the main body portion 12 can be insulated and isolated from the shell 20, even if the particles remaining in the shell 20 pierce the separator of the main body portion 12, the first insulating member 50 can prevent the electrode plates in the main body portion 12 from being conducted with the shell 20, thereby reducing the risk of short circuit. The first insulating plate 51 can cover a part of the end face of the main body portion 12 facing the cap assembly 30, and thus the first insulating member 51 can block particles, and reduce the particles falling into the main body portion 12 and thus reduce the risk of short circuit. The first insulating member 50 is connected to the main body portion 12 through the first insulating plate 51 which is attached to the main body portion 12, and thus the electrode unit 10 can be pre-assembled with the first insulating member 50 in advance, and then is assembled with other members; as such, the first insulating member 50 can protect the electrode unit 10 during the assembly process, reduce the risk of external impurities (for example, the particles) adhering to the electrode unit 10, and improve the safety performance of the battery cell 7.

For example, when welding the tab portion 13 with the current collecting member 40, the generated metal particles will splatter around; the embodiments of the present application can pre-assemble the first insulating member 50 on the electrode unit 10, and the first insulating member 50 can protect the electrode unit 10 from the outer side, reduce the metal particles adhering to the electrode unit 10, and thus reduce safety hazards.

In some embodiments, the first insulating plate 51 is attached to a surface of the main body portion 12 from which the tab portion 13 is drawn out. In other words, the tab portion 13 is drawn out from a surface of the main body portion 12 facing the cap assembly 30. There are gaps on the surface of the main body portion 12 from which the tab portion 13 is drawn out, and particles may enter the interior of the main body portion 12 through the gaps, thereby causing a risk of short circuit. The first insulating plate 51 in the embodiments of the present application can cover the gaps on the surface of the main body portion 12, reduce the risk of particles entering the main body portion 12 and improve the safety performance of the battery cell 7.

In some embodiments, the first insulating plate 51 includes an insulating layer and a bonding layer, and the bonding layer is disposed on a surface of the insulating layer facing the main body portion 12 and is bonded to the main body portion 12.

The insulating layer is made of PP (polypropylene) or PET (polyethylene terephthalate). The bonding layer may be a back glue. The insulating layer may have a thickness in a range of 0.1 mm to 0.2 mm.

In the present embodiment, the bonding layer is bonded to the main body portion 12 so as to connect the first insulating member 50 to the main body portion 12. The bonding connection manner is easy to operate, which facilitates to simplify the assembly of the first insulating member 50 and the electrode unit 10.

In some embodiments, a plurality of first insulating plates 51 are provided, and the plurality of first insulating plates 51 are arranged at intervals along a circumferential direction of the main body portion 12. The plurality of first insulating plates 51 can increase connection area between the first insulating member 50 and the main body portion 12 and can increase connection strength between the first insulating member 50 and the main body portion 12. Since the plurality of first insulating plates 51 are arranged at intervals along the circumferential direction of the main body portion 12, an acting force between the first insulating member 50 and the main body portion 12 can be made more uniform and stress concentration can be reduced. The first insulating plate 51 is disposed to avoid the tab portion 13, and thus can be prevented from interfering with the drawing-out of the tab portion 13.

Figure 7:
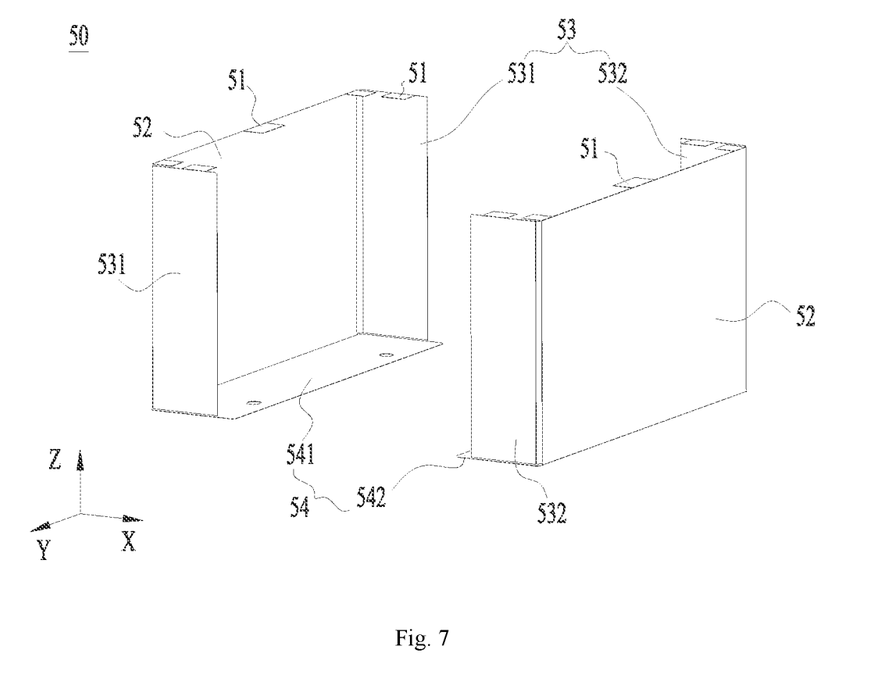
FIG. 7 is an exploded schematic diagram of the first insulating member as shown in FIG. 6.
Figure 8:
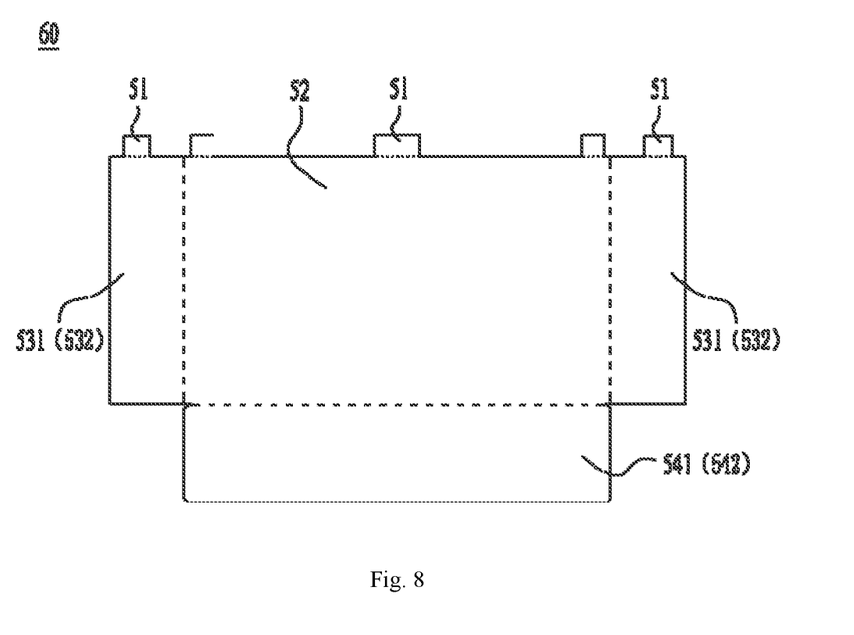
FIG. 8 is a schematic structural diagram of a kind of insulating sheet for preparing a first insulating member of a battery cell according to some embodiments of the present application.
Figure 9:
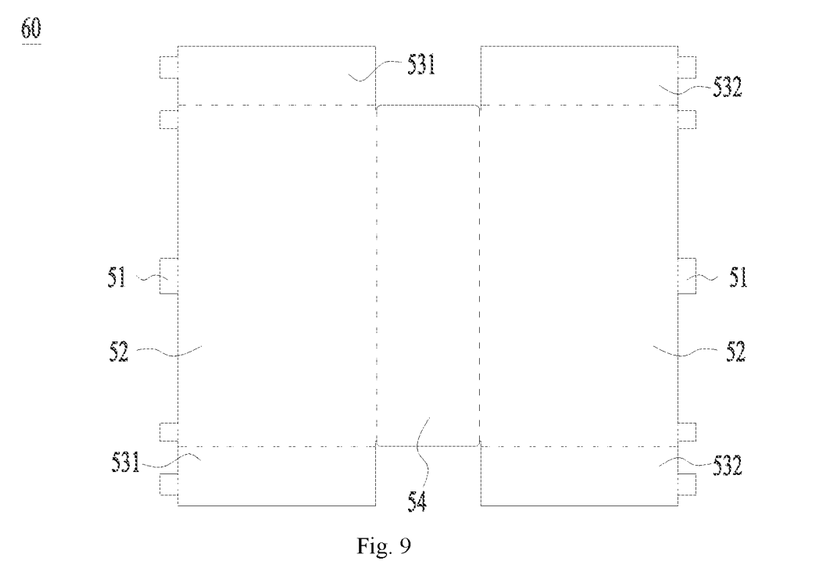
FIG. 9 is a schematic structural diagram of another kind of insulating sheet for preparing a first insulating member of a battery cell according to some embodiments of the present application.

FIG. 7 is an exploded schematic diagram of the first insulating member shown in FIG. 6; FIG. 8 is a structural schematic diagram of a kind of an insulating sheet for preparing a first insulating member of a battery cell according to some embodiments of the present application; and FIG. 9 is a schematic structural diagram of another kind of insulating sheet for preparing a first insulating member of a battery cell according to some embodiments of the present application.

Referring to FIG. 6 and FIG. 7 in combination, in some embodiments, the first insulating member 50 further includes two second insulating plates 52 and two third insulating plates 53. The two second insulating plates 52 are respectively disposed on two sides of the main body portion 12 in a first direction X; the two third insulating plates 53 are respectively disposed on two sides of the main body portion 12 in a second direction Y, and each third insulating plate 53 connects the two second insulating plates 52.

The first direction X and the second direction Y are arranged to intersect with each other, and the first direction X and the second direction Y are respectively perpendicular to a thickness direction of the cap assembly 30. The thickness direction of the cap assembly 30 is a thickness direction of the cap 31. Optionally, the first direction X is perpendicular to the second direction Y.

The two second insulating plates 52 may isolate the main body portion 12 from the shell 20 in the first direction X, and the two third insulating plates 53 may isolate the main body portion 12 from the shell 20 in the second direction Y.

Optionally, the second insulating plate 52 is formed as generally a flat plate perpendicular to the first direction X, and the third insulating plate 53 is formed as generally a flat plate perpendicular to the second direction Y. The two second insulating plates 52 and the two third insulating plates 53 are connected together to form an approximately rectangular frame.

Optionally, the second insulating plate 52 has an area larger than that of the third insulating plate 53.

An end of the second insulating plate 52 close to the cap assembly 30 is connected with the first insulating plate 51, and/or an end of the third insulating plate 53 close to the cap assembly 30 is connected with the first insulating plate 51.

When the second insulating plate 52 is connected with the first insulating plate 51, the first insulating plate 51 may be provided integrally with the second insulating plate 52, or may be connected with the second insulating plate 52 by butt fusion, bonding or the like. When the third insulating plate 53 is connected with the first insulating plate 51, the first insulating plate 51 may be provided integrally with the third insulating plate 53, or may be connected to the third insulating plate 53 by butt fusion, bonding or the like.

The second insulating plate 52 and the third insulating plate 53 may be fixed to the main body portion 12 through the first insulating plate 51, or may be directly attached to the main body portion 12.

In some embodiments, the third insulating plate 53 includes a first portion 531 and a second portion 532, the first portion 531 is provided integrally with one second insulating plate 52, and the second portion 532 is provided integrally with the other second insulating plate 52. The first portion 531 is bent relative to the corresponding second insulating plate 52, and the second portion 532 is bent relative to the corresponding second insulating plate 52.

The first portion 531 and the second portion 532 at least partially overlap in the second direction Y, and the first portion 531 and the second portion 532 are connected in an overlapping region; and/or, the first portion 531 and the second portion 532 are both bonded to the main body portion 12.

The first portion 531 and the second portion 532 may be formed by bending. After bending, the first portion 531 and the second portion 532 may flare outward under the action of their own elasticity.

In some examples, the first portion 531 and the second portion 532 at least partially overlap in the second direction Y, and the first portion 531 and the second portion 532 are connected by butt fusion or the like in the overlapping region. The first portion 531 and the second portion 532 are restricted by each other, and thus are prevented from flaring outward. In this case, the first portion 531 and the second portion 532 may be bonded to the main body portion 12 or may be independent of the main body portion 12.

In some other examples, the first portion 531 and the second portion 532 are both bonded to the main body portion 12, so that the first portion 531 and the second portion 532 are both fixed to the main body portion 12, and will not flare outward. In this case, the first portion 531 and the second portion 532 may be connected to each other, or may be independent of each other.

In some embodiments, the first insulating member 50 further includes a fourth insulating plate 54, the fourth insulating plate 54 is located on a side of the main body portion 12 away from the first insulating plate 51 and connects the two second insulating plates 52, the first insulating plate 51 and the fourth insulating plate 54 are arranged along a third direction Z, and the first direction X, the second direction Y and the third direction Z intersect with each other.

The fourth insulating plate 54 can insulate and isolate a bottom wall of the shell 20 facing the cap 31 from the main body portion 12, thereby reducing the risk of short circuit.

Optionally, the third direction Z is parallel to the thickness direction of the cap assembly 30, that is, the third direction Z is perpendicular to the first direction X and the second direction Y.

The fourth insulating plate 54 is formed as generally a flat plate perpendicular to the third direction Z. The fourth insulating plate 54 is bent relative to the second insulating plate 52. The fourth insulating plate 54 may be provided integrally with the second insulating plate 52, or may be connected with the second insulating plate 52 by butt fusion or the like.

In some embodiments, the fourth insulating plate 54 includes a third portion 541 and a fourth portion 542, the third portion 541 is provided integrally with one second insulating plate 52, and the fourth portion 542 is provided integrally with the other second insulating plate 52. The third portion 541 is bent relative to the corresponding second insulating plate 52, and the fourth portion 542 is bent relative to the corresponding second insulating plate 52.

The third portion 541 and the fourth portion 542 at least partially overlap in the third direction Z, and the third portion 541 and the fourth portion 542 are connected in an overlapping region; and/or, the third portion 541 and the fourth portion 542 are both bonded to the main body portion 12.

The third portion 541 and the fourth portion 542 may be formed by bending. After bending, the third portion 541 and the fourth portion 542 may flare outward under the action of their own elasticity.

In some examples, the third portion 541 and the fourth portion 542 at least partially overlap in the third direction Z, and the third portion 541 and the fourth portion 542 are connected by butt fusion or the like in the overlapping region. The third portion 541 and the fourth portion 542 are restricted by each other, and are prevented from flaring outward. In this case, the third portion 541 and the fourth portion 542 may be both bonded to the main body portion 12, or may be independent of the main body portion 12.

In some other examples, the third portion 541 and the fourth portion 542 are both bonded to the main body portion 12, so that the third portion 541 and the fourth portion 542 are both fixed to the main body portion 12 and will not flare outward. In this case, the third portion 541 and the fourth portion 542 may be connected to each other, or may be independent of each other.

The first insulating member 50 of the present application may be formed from an insulating sheet 60 by bending, butt fusion and other processes.

In some embodiments, the first insulating member 50 of the present application can be prepared from the insulating sheet 60 as shown in FIG. 8. Specifically, two insulating sheets 60 are respectively attached to two sides of the electrode unit 10 at first, and then are bent along the dotted lines in FIG. 8 to form two insulating frames (generally as shown in FIG. 7), so that the two insulating frames wrap the electrode unit 10, and finally the overlapping portions of the two insulating frames are connected together by butt fusion to form the first insulating member 50 assembled on the electrode unit 10.

In some other embodiments, the first insulating member 50 of the present application can be prepared from the insulating sheet 60 as shown in FIG. 9. Specifically, the electrode unit 10 is placed on the insulating sheet 60 (for example, on the fourth insulating plate 54) at first, then the insulating sheet 60 is bent along the dotted lines in FIG. 9 to form an insulating frame, and finally the overlapping portions of the insulating frame (for example, the first and second portions 531 and 532, the third and fourth portions 541 and 542) are connected together by butt fusion.

Figure 10:
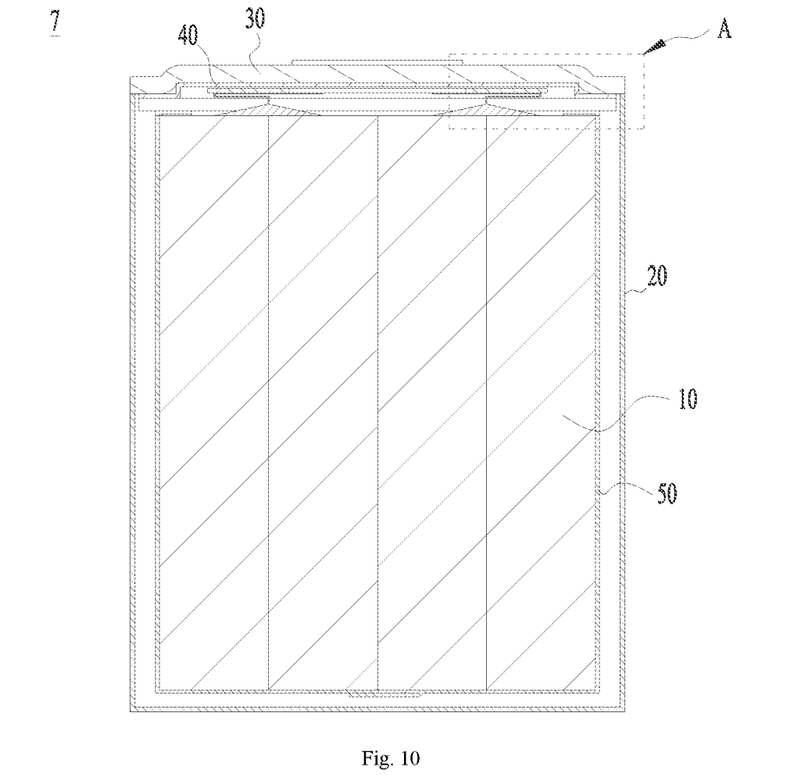
FIG. 10 is a schematic cross-sectional view of a battery cell provided by a specific embodiment of the present application.
Figure 11:
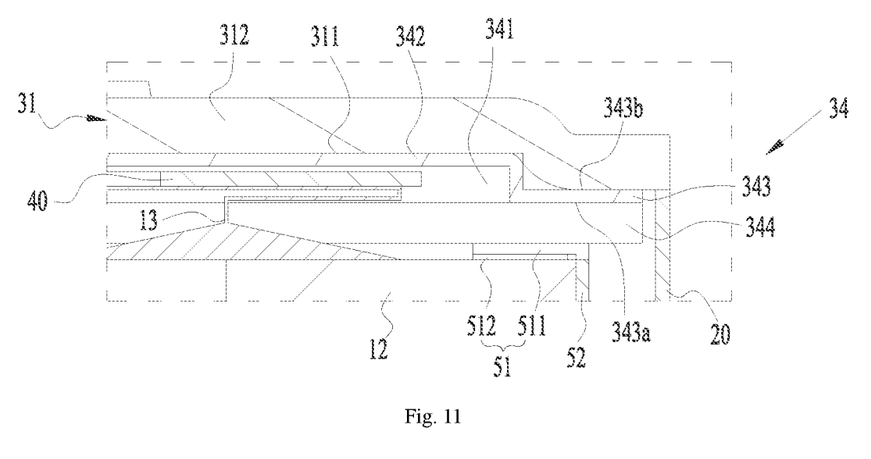
FIG. 11 is an enlarged schematic view of the battery cell shown in FIG. 10 at block A.

FIG. 10 is a schematic cross-sectional view of a battery cell according to a specific embodiment of the present application; and FIG. 11 is an enlarged schematic diagram of the battery cell shown in FIG. 10 at block A.

As shown in FIGS. 10 and 11, the cap assembly 30 further includes a second insulating member 34, and the second insulating member 34 is located on a side of the cap 31 facing the electrode unit 10. The second insulating member 34 is used to insulate and isolate the cap 31 from the electrode unit 10 so as to reduce the risk of short circuit.

The second insulating member 34 is formed with a first concave portion 341 on a side facing the main body portion 12, and the first concave portion 341 is configured to accommodate at least part of the tab portion 13 and/or at least part of the current collecting member 40. Since the first concave portion 341 can accommodate at least part of the tab portion 13 and/or at least part of the current collecting member 40, more space can be freed up for the electrode unit 10.

It should be noted that, the first concave portion 341 being configured to accommodate at least part of the tab portion 13 and/or at least part of the current collecting member 40, means that at least part of the tab portion 13 is accommodated in the first concave portion 341, at least part of the current collecting member 40 is accommodated in the first concave portion 341, or at least part of the tab portion 13 and at least part of the current collecting member 40 are both accommodated in the first concave portion 341.

At least part of the first insulating plate 51 is sandwiched between the second insulating member 34 and the main body portion 12. The second insulating member 34 presses the first insulating plate 51 from one side, so that the first insulating plate 51 is closely attached to the main body portion 12, thereby improving the connection strength between the first insulating plate 51 and the main body portion 12, and reducing the risk of the first insulating plate 51 separating from the main body portion 12.

When a plurality of first insulating plates 51 are provided, all the first insulating plates 51 may be pressed by the second insulating member 34, or some of the first insulating plates 51 may be pressed by the second insulating member 34 while there are gaps between other first insulating plates 51 and the second insulating member 34.

The second insulating member 34 is formed with a first convex portion 342 on a side facing away from the main body portion 12 at a position corresponding to the first concave portion 341, the cap 31 is formed with a second concave portion 311 on a side facing the main body portion 12, and the second concave portion 311 is adapted to accommodate the first convex portion 342. On the one hand, the first convex portion 342 can strengthen the position of the second insulating member 34 where the first concave portion 341 is provided, and on the other hand, the arrangement of the first convex portion 342 can make the first concave portion 341 recesses in a direction away from the main body portion 12 as much as possible, so as to increase the recessing depth of the first concave portion 341. The first convex portion 342 is accommodated in the second concave portion 311, which can reduce the internal space of the shell 20 occupied by the second insulating member 34, and further free up more space for the electrode unit 10, thereby effectively improving the capacity of the battery cell 7.

Exemplarily, the cap 31 is formed with a second convex portion 312 on a side away from the main body portion 12 at a position corresponding to the second concave portion 311. The second convex portion 312 strengthens the position of the cap 31 where the second concave portion 311 is provided.

The second insulating member 34 includes an insulating body portion 343, the insulating body portion 343 includes an inner surface 343a facing the main body portion 12 and an outer surface 343b facing away from the main body portion 12, the first concave portion 341 is recessed from the inner surface 343a in a direction away from the main body portion 12, and the first convex portion 342 protrudes from the outer surface 343b.

In the present application, by arranging the first concave portion 341, an accommodating space can be provided for the tab portion 13 and/or the current collecting member 40, so that the distance between the main body portion 12 and the cap 31 can be accordingly reduced, and correspondingly, the thickness of the insulating body portion 343 can also be accordingly reduced to increase the capacity of the battery cell 7.

The inventor further tried to connect the first insulating member to a peripheral surface of the insulating body portion by the manner of butt fusion, to realize the fixing of the first insulating member; however, the thickness of the insulating body portion is reduced to increase the capacity in the embodiments of the present application, which may result in a relatively small connection area between the insulating body portion and the first insulating member, thereby causing a high risk of falling off of the first insulating member. Therefore, in the embodiments of the present application, the first insulating member 50 is attached to the main body portion 12, which can ensure the connection area between the first insulating member 50 and the main body portion 12 and reduce the risk of falling off of the first insulating member 50.

The second insulating member 34 further includes a third convex portion 344. The third convex portion 344 protrudes out from the inner surface 343a and is pressed against the first insulating plate 51 and/or the main body portion 12. The third convex portion 344 can limit the shaking of the main body portion 12.

The insulating layer 511 of the first insulating plate 51 is bonded to the second insulating member 34 and/or the main body portion 12 through the bonding layer 512.

In some embodiments, two surfaces of the first insulating plate 51 are respectively bonded to the second insulating member 34 and the main body portion 12, so as to reduce the risk of falling off of the first insulating plate 51 from the position between the second insulating member 34 and the main body portion 12. Optionally, the first insulating plate 51 is bonded to the third convex portion 344 through the bonding layer 512.

Although the present application has been described with reference to the preferred embodiments, various modifications may be made to the present application and components of the present application can be replaced by equivalents without departing from the scope of the present application, in particular, as long as there is no structural conflict, the various technical features mentioned in the various embodiments can be combined in any manner. The present application is not limited to the specific embodiments disclosed herein, but includes all technical solutions falling within the scope of the claims.

What is claimed is:

1. A battery cell, comprising:
a shell, comprising an opening;
an electrode unit, accommodated in the shell, the electrode unit comprising a main body portion and a tab portion protruding from a top surface of the main body portion;
a cap assembly, for connecting with the shell, and covering and closing the opening; and
a first insulating member, accommodated in the shell and adapted to isolate at least part of the main body portion from the shell, the first insulating member comprising a first insulating plate, and the first insulating plate being disposed on a side of the main body portion facing the cap assembly and being attached to the main body portion, wherein
the cap assembly comprises a cap, an electrode terminal, and a second insulating member, the cap being adapted to cover and close the opening, the electrode terminal being mounted on the cap, and the second insulating member extending along the top surface and being disposed between the cap and the main body portion of the electrode unit,
the second insulating member comprises a first concave portion on a side facing the main body portion, the first concave portion being configured to accommodate at least a part of the tab portion, and
at least part of the first insulating plate is attached to and sandwiched between the second insulating member and the main body portion.

2. The battery cell according to claim 1, wherein the first insulating plate is attached to the top surface of the main body portion.

3. The battery cell according to claim 1, wherein the first insulating plate comprises an insulating layer and a bonding layer, the bonding layer being disposed on a surface of the insulating layer facing the main body portion and bonded to the main body portion.

4. The battery cell according to claim 1, wherein the first insulating member further comprises:
two second insulating plates, respectively disposed on two sides of the main body portion in a first direction;
two third insulating plates, respectively disposed on two sides of the main body portion in a second direction, wherein each third insulating plate connects the two second insulating plates;
wherein an end of the second insulating plate close to the cap assembly is connected with the first insulating plate, and/or an end of the third insulating plate close to the cap assembly is connected with the first insulating plate;
the first direction and the second direction are arranged to intersect with each other, and the first direction and the second direction are respectively perpendicular to a thickness direction of the cap assembly.

5. The battery cell according to claim 4, wherein the third insulating plate comprises a first portion and a second portion, the first portion being provided integrally with one of the second insulating plates, and the second portion being provided integrally with the other one of the second insulating plates,
the first portion and the second portion at least partially overlap in the second direction, and are connected in an overlapping region; and/or the first portion and the second portion are both bonded to the main body portion.

6. The battery cell according to claim 4, wherein the first insulating member further comprises a fourth insulating plate located on a side of the main body portion facing away from the first insulating plate and connecting the two second insulating plates, wherein the first insulating plate and the fourth insulating plate are arranged along a third direction, and the first direction, the second direction and the third direction intersect with each other.

7. The battery cell according to claim 6, wherein the fourth insulating plate comprises a third portion and a fourth portion, the third portion being provided integrally with one of the second insulating plates, and the fourth portion being provided integrally with the other one of the second insulating plates;
the third portion and the fourth portion at least partially overlap in the third direction, and are connected in an overlapping region; and/or, the third portion and the fourth portion are both bonded to the main body portion.

8. The battery cell according to claim 1, wherein,
the battery cell further comprises a current collecting member, the current collecting member being adapted to connect the electrode terminal with the tab portion;
the first concave portion of the second insulating member is configured to accommodate at least a part of the current collecting member.

9. The battery cell according to claim 8, wherein the second insulating member is formed with a first convex portion on a side facing away from the main body portion at a position corresponding to the first concave portion, the cap is formed with a second concave portion on a side facing the main body portion, and the second concave portion is adapted to accommodate the first convex portion.

10. The battery cell according to claim 8, wherein two surfaces of the first insulating plate are bonded to the second insulating member and the main body portion, respectively.

11. A battery comprises a case and the battery cell according to claim 1, wherein the battery cell is accommodated in the case.

12. An electrical consuming device comprising the battery according to claim 11, the battery is adapted to provide electrical energy.

13. The battery cell according to claim 1, wherein the cap assembly further comprises a pressure relief valve mounted on the cap, the pressure relief valve is configured to release an internal pressure of the battery cell when the internal pressure of the battery cell reaches a predetermined value.

* * * * *